(12) United States Patent
Mayer et al.

(10) Patent No.: US 11,514,018 B2
(45) Date of Patent: Nov. 29, 2022

(54) METHOD AND DATA CONVERSION UNIT FOR MONITORING AN AUTOMATION SYSTEM

(71) Applicant: Endress+Hauser Process Solutions AG, Reinach (CH)

(72) Inventors: Michael Mayer, Oberwil (CH); Axel Pöschmann, Basel (CH)

(73) Assignee: Endress+Hauser Process Solutions AG, Reinach (CH)

( * ) Notice: Subject to any disclaimer, the term of this patent is extended or adjusted under 35 U.S.C. 154(b) by 262 days.

(21) Appl. No.: 16/629,703

(22) PCT Filed: Jun. 20, 2018

(86) PCT No.: PCT/EP2018/066381
§ 371 (c)(1),
(2) Date: Jan. 9, 2020

(87) PCT Pub. No.: WO2019/011603
PCT Pub. Date: Jan. 17, 2019

(65) Prior Publication Data
US 2020/0394174 A1    Dec. 17, 2020

(30) Foreign Application Priority Data
Jul. 11, 2017    (DE) ............... 10 2017 115 517.1

(51) Int. Cl.
*G06F 16/23*    (2019.01)
*G06F 16/27*    (2019.01)
(Continued)

(52) U.S. Cl.
CPC ..... *G06F 16/2358* (2019.01); *G05B 19/0428* (2013.01); *G06F 16/2365* (2019.01);
(Continued)

(58) Field of Classification Search
None
See application file for complete search history.

(56) References Cited

U.S. PATENT DOCUMENTS

| 6,192,281 B1 * | 2/2001 | Brown | ............... G05B 19/0425 700/2 |
| 2006/0206806 A1 * | 9/2006 | Han | ............... G06F 16/345 715/236 |

(Continued)

FOREIGN PATENT DOCUMENTS

| DE | 102005051580 A1 | 5/2007 |
| DE | 102005051580 A1 | 5/2007 |

(Continued)

*Primary Examiner* — Wilson Lee
(74) *Attorney, Agent, or Firm* — Mark A. Logan; Endress+Hauser (USA) Holding Inc.

(57) ABSTRACT

The invention includes a method for monitoring an automated plant having at least one field device, wherein a first cloud-capable database, having a first data configuration and containing field device related data including measured values, parameter values, identification data, and diagnostic status of the field device, wherein a second cloud-capable database having a second data configuration incompatible with the first data configuration, and wherein the first and the second data configurations define file formats of the data, the method comprises: retrieving at least a part of the data contained in the first database by means of a data conversion unit, especially an edge device or a gateway; converting the retrieved data into a format conforming to the second data configuration; and storing the converted data in the second database. The invention further includes a data conversion unit, which is embodied for executing the method of the invention.

3 Claims, 1 Drawing Sheet

(51) Int. Cl.
  *G06F 16/25*     (2019.01)
  *G06F 16/2455*   (2019.01)
  *G05B 19/042*    (2006.01)

(52) U.S. Cl.
  CPC ...... *G06F 16/24564* (2019.01); *G06F 16/258* (2019.01); *G06F 16/273* (2019.01)

(56) References Cited

U.S. PATENT DOCUMENTS

| | | | | |
|---|---|---|---|---|
| 2006/0206866 | A1* | 9/2006 | Eldrige | G06F 8/71 717/122 |
| 2006/0259392 | A1* | 11/2006 | Rabenold | G06Q 10/10 705/37 |
| 2009/0113049 | A1* | 4/2009 | Nasle | G05B 19/0428 709/224 |
| 2009/0241817 | A1* | 10/2009 | Eastin | A01M 7/0092 239/8 |
| 2009/0282067 | A1* | 11/2009 | Bendigeri | G06Q 10/06 |
| 2011/0134248 | A1* | 6/2011 | Heit | H04N 1/00286 348/161 |
| 2011/0270723 | A1* | 11/2011 | O'Neil | G06Q 50/02 718/100 |
| 2012/0072317 | A1* | 3/2012 | O'Neil | G06Q 30/04 705/30 |
| 2012/0102240 | A1* | 4/2012 | Wei | H04L 12/66 710/30 |
| 2013/0201316 | A1* | 8/2013 | Binder | H04L 67/12 348/77 |
| 2014/0201084 | A1* | 7/2014 | Dagenais | G06Q 20/382 705/64 |
| 2015/0026223 | A1* | 1/2015 | Hahn | G06F 16/256 707/812 |
| 2015/0242381 | A1* | 8/2015 | Oh | H04L 51/066 715/204 |
| 2015/0276208 | A1* | 10/2015 | Maturana | G06F 9/5072 700/274 |
| 2016/0048712 | A1* | 2/2016 | Butler | H01Q 1/38 340/10.51 |
| 2016/0274978 | A1* | 9/2016 | Strohmenger | G06F 11/1458 |
| 2017/0078455 | A1* | 3/2017 | Fisher | H04L 69/326 |
| 2017/0351226 | A1* | 12/2017 | Bliss | G06F 16/2471 |
| 2017/0357253 | A1* | 12/2017 | Kilpatrick | G05B 19/0428 |
| 2018/0052835 | A1* | 2/2018 | Billi-Duran | G06F 16/487 |
| 2018/0088566 | A1* | 3/2018 | Billi-Duran | G05B 19/41885 |
| 2018/0124178 | A1* | 5/2018 | Alberth, Jr. | H04L 67/12 |
| 2019/0014175 | A1* | 1/2019 | Malachowski | H04L 67/2895 |
| 2021/0096827 | A1* | 4/2021 | Stump | G05B 13/0265 |

FOREIGN PATENT DOCUMENTS

| | | |
|---|---|---|
| DE | 102014119515 A1 | 6/2016 |
| EP | 2660667 A2 | 11/2013 |

* cited by examiner

METHOD AND DATA CONVERSION UNIT FOR MONITORING AN AUTOMATION SYSTEM

CROSS-REFERENCE TO RELATED APPLICATIONS

The present application is related to and claims the priority benefit of German Patent Application No. 10 2017 115 517.1, filed on Jul. 11, 2017 and International Patent Application No. PCT/EP2018/066381 filed on Jun. 20, 2018, the entire contents of which are incorporated herein by reference.

TECHNICAL FIELD

The invention relates to a method for monitoring an automation system, i.e. an automated plant, in which at least one field device is applied. Furthermore, the invention relates to a data conversion unit for executing the method of the invention.

BACKGROUND

Known from the state of the art are field devices, which are used in industrial plants. In automation technology, especially the automation of manufacturing, field devices are often applied. Referred to as field devices are, in principle, all devices, which are applied near to a process and which deliver, or process, process relevant information. Thus, field devices are used for registering and/or influencing process variables. Serving for registering process variables are measuring devices utilizing sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a tube or the fill level in a container. Besides the above mentioned measurement devices and actuators, referred to as field devices are also remote I/Os, radio adapters, and, in general, devices, which are arranged at the field level.

A large number of such field devices are produced and sold by the Endress+Hauser group of companies.

In modern industrial plants, field devices are, as a rule, connected via communication networks, such as, for example, fieldbusses (Profibus®, Foundation® Fieldbus, HART®, etc.), with superordinated units. The superordinated units are control units, such as, for example, a PLC (programmable logic controller). The superordinated units serve, among other things, for process control, as well as for start-up of the field devices. The measured values registered by the field devices, especially by their sensors, are transmitted via the particular bus system to a (or, in given cases, a plurality of) superordinated unit(s), which, in given cases, process the measured values further and forward them to the control station of the plant. The control station serves for process visualizing, process monitoring and process control via the superordinated units. In addition, also data transmission from the superordinated unit via the bus system to the field devices is required, especially for configuration and parametering of field devices, as well as for operating actuators.

For servicing the field devices, corresponding operating programs (operating tools) are necessary, which run in the superordinated units either on their own (Endress+Hauser FieldCare, Pactware, AMS Fisher-Rosemount, PDM Siemens) or, however, also are integrated into applications of the control station (Siemens PCS7, ABB Symphony, Emerson Delta V). The terminology, servicing, refers, among other things, to a parametering of the field device, an updating of the field device and/or a querying and visualizing of process data and/or diagnostic data of the field device.

In the context of Industry 4.0, data produced by the field devices are also frequently obtained directly from the field with the help of so-called data conversion units, which, for example, are also referred to as "edge devices" or "cloud gateways", and transmitted automatically to a central, cloud-capable database, in which an application is located. This application, which, among other things, provides functions for visualizing and additional processing of the data stored in the database, can be accessed by a user by means of the Internet.

Typically, the data obtained from the data conversion units are transmitted to various databases. Involved in such case, most often, are proprietary databases of the manufacturer of a data conversion unit. A data exchange between the different databases is, consequently, often not possible or desired. Thus, many different commercial implementations exist—synergistic effects are very difficult or impossible to achieve.

SUMMARY

Based on the above, an object of the invention is to provide a method, which enables a consistent managing of data of a plurality of cloud-capable databases incompatible relative to one another.

The object is achieved by a method for monitoring an automated plant, in which at least one field device is applied, wherein a first database, especially a cloud-capable database, has a first data configuration and contains field device related data, especially measured values, parameter values, identification data and/or diagnostic status of the field device,
wherein a second database, especially a cloud-capable database, has a second data configuration incompatible with the first data configuration, and
wherein the first and the second data configurations define file formats of the data, i.e. their semantics and/or rules for organizing and/or for storing the data in the first and second databases, which method comprises:
  retrieving at least a part of the data contained in the first database by means of a data conversion unit, especially an edge device or a gateway;
  converting the retrieved data into a format conforming to the second data configuration; and
  storing the converted data in the second database.

A great advantage of the method of the invention is that data from the first database can be transmitted to the second database, even though the databases have different data configurations. The second database does not have to be specially configured, since the data conversion unit, such as a conventional edge device, which is located in a plant, does the communication. Consequently, access to data of a field device can occur by means of the second database, even though the second database is not connected with the field device.

A database is "cloud-capable" in the sense of the invention, when such can be contacted by a user via the Internet. It can, in such case, be provided that the database has an application, for example, for visualizing field device specific data, which are stored in the database, or for configuring the database, for example, for establishing and selecting devices, in the sense of the invention, data conversion units, which provide data to the database, which stores the data. A user can from its device, for example, a PC or a mobile end device, access the application of the database per Internet.

Field devices mentioned in connection with the method of the invention have already been listed, by way of example, above in the introductory part of the description.

A preferred embodiment of the method of the invention provides that the field device related data are collected by means of a second data conversion unit, which is especially located in the plant, are transmitted to the first database and are stored in the first database. Usually, this data conversion unit must be selected in the application located in the first database, in order that its data are stored in the first database. The same holds analogously for the first data conversion unit, which is "registered" in the second database. For the databases, it is not evident from which source a data conversion unit draws its data.

In an advantageous, further development of the method of the invention, it is provided that the method further comprises method steps as follows:
retrieving by means of the data conversion unit at least a part of the data contained in the second database and not, or only partially, contained in the first database;
transforming the retrieved data into a format compatible with the first data configuration; and
storing the converted data in the first database.

The method of the invention can, thus, be utilized bidirectionally. For this, the first data conversion unit must be selected, or registered, both in the first, as well as also in the second database.

In an advantageous embodiment of the method of the invention, it is provided that the second database is connected for communication with a field device of a second automated plant and wherein at least a part of the data retrieved from the first database is used for servicing the field device. The terminology, "servicing", means, among others, a parametering of the field device, an updating of the field device and/or a querying and visualizing of process data and/or diagnostic data of the field device. The method enables, consequently, for example, a parametering of a field device with data, which come from the first database.

In an advantageous embodiment of the method of the invention, it is provided that the data located in the first and the second databases are synchronized in such a manner by means of the data conversion unit, especially in recurring, defined time intervals, that after termination of a synchronizing procedure the databases have essentially equal data. This makes it easier for a user. If it was using a plurality of databases, afterwards it need only access a single database, in order to reach all the data. It is, moreover, assured that the data is current.

Furthermore, the object is achieved by a data conversion unit, which is embodied for executing the method of the invention.

In a preferred further development of the data conversion unit of the invention, it is provided that the data conversion unit is embodied to retrieve at least a part of the data contained in the first database and actively to transmit to the second database all changes to the data contained in the second database and/or data not yet contained in the second database. The data transmission is actively driven by the data conversion unit, in that it pushes the data into the second database. Thus, the second database, consequently, does not, for instance, actively call data via the data conversion unit, but, instead, receives the data automatically delivered.

In a first variant of the data conversion unit of the invention, it is provided that the data conversion unit is embodied as a virtual data conversion unit. A virtual data conversion unit enables the same functionalities as a data conversion unit embodied as a physical device.

In an advantageous embodiment of the first variant of the data conversion unit of the invention, it is provided that the virtual data conversion unit is implemented and executable as an application in the first database or the second database. Also, in this case, the data conversion unit must be selected in the application located in the first database, in order that its collected data be stored in the first database. For the database, it is, in such case, not evident that the data conversion unit is a virtual data conversion unit.

In a second variant of the data conversion unit of the invention, it is provided that the data conversion unit is embodied as a physical data conversion unit. "Physical" means that the data conversion unit is a manually graspable device, which has at least one electronics module, with whose help the data can be retrieved from the first database, converted and transmitted to the second database.

In an advantageous, further development of the second variant of the data conversion unit of the invention, it is provided that the data conversion unit has a first interface and n other interfaces, wherein the first interface is connectable via a first communication network with at least a first database and wherein the n-th interface is connectable via an n-th communication network with at least an n-th database, wherein n≥2. The method of the invention can, in such case, be performed by means of the data conversion unit with each of the databases, so that the second database receives at least a part of the data of each of the databases.

BRIEF DESCRIPTION OF THE DRAWINGS

The invention will now be explained in greater detail based on the appended drawing, the figures of which show as follows.

DETAILED DESCRIPTION

Figure 1:
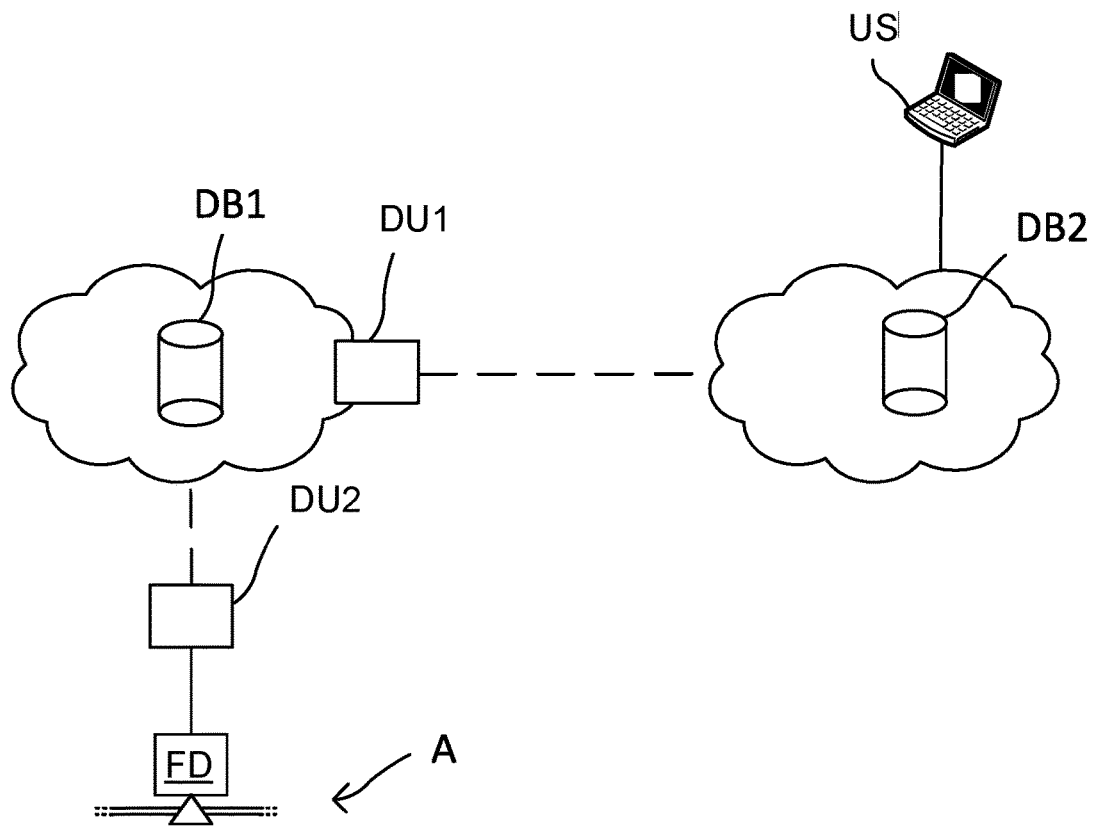
FIG. 1 shows a first example of an embodiment of the method of the present disclosure.

FIG. 1 shows a first example of an embodiment of the method of the invention. A field device FD is arranged in an automated plant A. Field device FD serves for registering a physical, measured variable and for changing the registered measured variable into a measured value. Examples of such field devices FD have already been mentioned, by way of example, in the introductory part of the description. Field device FD is connected via a communication interface with a fieldbus (not shown), via which it transmits measured values to the control station of the plant A. Additionally, the field device FD is connected with a data conversion unit DU2. The connection with the data conversion unit occurs either via a separate communication interface of the field device FD or via the fieldbus.

The second data conversion unit DU2 is especially an edge device or a cloud gateway. In regular time intervals, the second data conversion unit DU2 collects data of the field device FD. In such case, the produced measured values, however, can also be diagnostic reports, parameter settings and/or identification data.

The collected field device data are transmitted by means of the Internet or a private network to a first database DB1. The connection occurs, for example, by wire, or wirelessly, for example, via a mobile data connection, such as GSM, UMTS, LTE, or the like. In order that the data can be stored in the first database DB1, the second data conversion unit DU2 must first be registered in the first database DB1. This occurs by means of an application running in the first database DB1. For this, a user US accesses the application of the first database DB1 via Internet or a private network.

The transmitted data are then stored in the first database DB1. The storing occurs based on a first data configuration. A data configuration establishes the file format of the stored data, i.e. the semantics and/or rules for organizing and/or storing the data in the first database DB1. The user US can then access the data by, for example, connecting with the application of the first database DB1.

Besides the shown part of the plant A with the field device FD, the user US can interact with a large number of other plant parts and field devices. In given cases, some other type of fieldbus is used, which is incompatible with the second data conversion unit DU2, or, for some other reason, for example, due to the geographical position, there is no other connection with the second data conversion unit DU2, so that other data conversion units are necessary. If these additional data conversion units are from another manufacturer, then the data collected from them are, among other things, stored in databases other than the first database DB1, which additional databases, in given cases, enable no data exchange. For the user US, there is, consequently, the need to collect the data of all its field devices in a single database.

In the example of an embodiment shown in FIG. 1, data stored in the first database DB1 are transferred by means of the method of the invention to a second database DB2. The second database DB2 has, in such case, a second data configuration incompatible with the first data configuration. Other field devices (not shown) can be connected, for example, by means of additional data conversion units, or directly, with the second database DB2, wherein their data are stored in the second database.

To fix this situation, a virtual data conversion unit in the form of a first data conversion unit DU1 is implemented in the first database DB1. The first data conversion unit DU1 is embodied as a software application and runs in the application of the first database DB1. The user US accesses the second database DB2. The first data conversion unit DU1 is, such as above described, registered in the second database DB2.

At predetermined points in time, the first data conversion unit DU1 collects data from the first database DB1. For this, the first data conversion unit DU1 knows the first data configuration of the first database DB1. The collected data are then converted into the format of the second data configuration and transmitted from the first data conversion unit DU1 to the second database DB2, which then stores the data. The transmission occurs via the Internet or via a private network. The data are, in such case, stored as if they had been directly collected from the field by a data conversion unit, since it is not evident for the second database DB2, from which source a data conversion unit draws its data.

The user US can then access the data of the field device FD by means of the application of the second database DB2. It can also be provided that, in the case that the second database DB2 is connected with an additional field device, this additional field device is parametered with the data of the field device FD, when these are applied, for example, in similar measuring points. Data from different system parts can, thus, be exchanged with one another and used in simple manner.

The method of the invention enables, moreover, the reversed path, so that data can be collected from the second database DB2 and be transferred to the first database DB1. It can also be provided the first and the second databases DB1, DB2 are synchronized by means of the first data conversion unit DU1.

Figure 2:
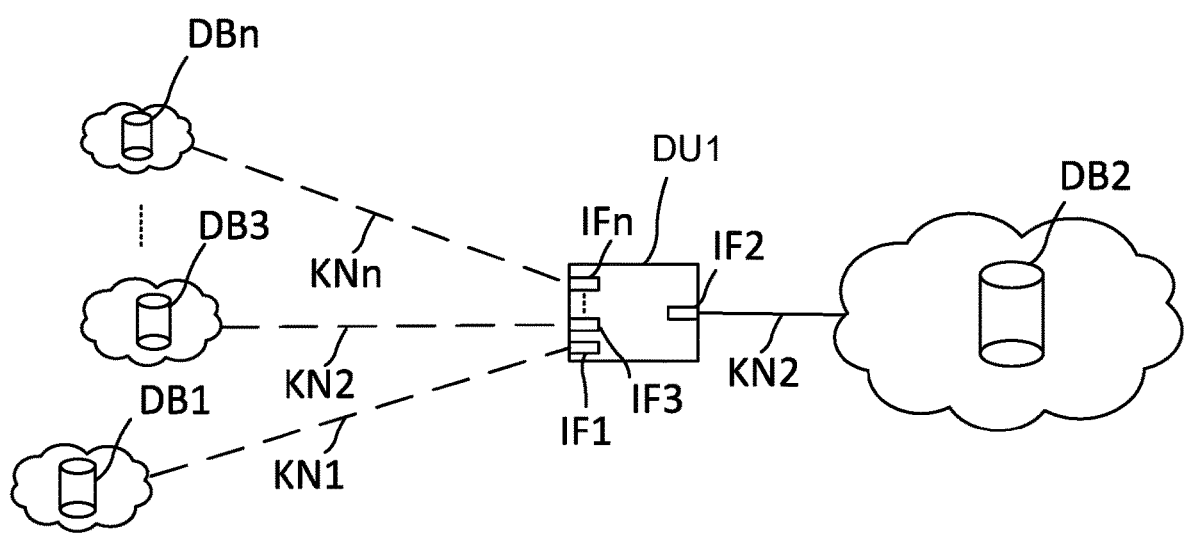
FIG. 2 shows a second example of an embodiment of the method of the present disclosure.

By means of the method of the invention, it is, moreover, possible to collect the data of a large number of databases DB1, DB3, . . . , DBn into a database DB2. FIG. 2 shows this case of application. The first data conversion unit DU1 is, in such case, embodied as a physical device. This has a plurality of communication interfaces IF1, IF2, IF3, . . . , IFn, which are connected via corresponding communication networks KN1, KN2, KN3, . . . , KNn with the individual databases DB1, DB2, DB3, . . . , DBn.

Alternatively, it can be provided that a single communication network is used, for example, the Internet, via which the first data conversion unit DU1 can contact the databases DB1, DB2, DB3, . . . , DBn. The communication interfaces IF1, IF2, IF3, . . . , IFn are, in this case, embodied as software communication interfaces.

The first data conversion unit DU1 is able, in such case, to understand each of the data configurations used by the databases DB1, DB2, DB3, . . . , DBn and to convert their data into another of the formats used by the data configurations.

The method steps set-forth in the discussion of FIG. 1 are performed analogously in the example of application shown in FIG. 2 for one or more databases DB1, DB3, . . . , DBn.

Of course, the first data conversion unit DU1 can also be embodied in this example of application as a virtual data conversion unit. In the same way, an option provides that the first data conversion unit DU1 provided in the example of an embodiment described in the discussion of FIG. 1 can be embodied as a physical device.

The invention claimed is:

1. A method for servicing an automated plant in which a first field device is applied, comprising:
providing a first cloud-capable database having a first data configuration and containing field device related data including measured values, parameter values, identification data, and diagnostic status of the field device;
providing a second data conversion unit;
collecting the field device related data from the first field device via the second data conversion unit;
transmitting the collected field device related data to the first database;
storing the collected field device related data in the first database;
providing a second cloud-capable database having a second data configuration different from the first data configuration, wherein the second database is connected for communication with a second field device of a second automated plant, wherein the first and the second data configurations define file formats of the data, including semantics and rules for organizing and for storing the data in the first and second databases;
providing a first data conversion unit including an edge device or a gateway;
retrieving data contained in the first database via the first data conversion unit;

converting the retrieved data into a format conforming to the second data configuration;

transferring the converted data to the second database via the first data conversion unit;

storing the converted data in the second database;

accessing the data of the second field device by means of an application of the second database; and servicing the second field device using the field device related data of the first field device retrieved from the second database, wherein the servicing includes parametering the second field device and querying and visualizing process data and diagnostic data of the second field device.

2. The method as claimed in claim 1, further comprising:

retrieving via the first data conversion unit at least a part of data contained in the second database not contained in the first database;

transforming the retrieved data into a format compatible with the first data configuration; and storing the converted data in the first database.

3. The method as claimed in claim 1, wherein the data located in the first and the second databases are synchronized in such a manner by the first data conversion unit in recurring, defined time intervals, that after termination of a synchronizing procedure the databases have essentially equal data.

\* \* \* \* \*